US011025676B2

(12) United States Patent
Kunz et al.

(10) Patent No.: US 11,025,676 B2
(45) Date of Patent: Jun. 1, 2021

(54) COMMUNICATION SYSTEM

(71) Applicant: NEC CORPORATION, Tokyo (JP)

(72) Inventors: Andreas Kunz, Ladenburg (DE); Genadi Velev, Darmstadt (DE); Iskren Ianev, Lower Earley (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/740,834

(22) PCT Filed: Jun. 30, 2016

(86) PCT No.: PCT/EP2016/065446
§ 371 (c)(1),
(2) Date: Dec. 29, 2017

(87) PCT Pub. No.: WO2017/001640
PCT Pub. Date: Jan. 5, 2017

(65) Prior Publication Data
US 2018/0191786 A1 Jul. 5, 2018

(30) Foreign Application Priority Data
Jun. 30, 2015 (EP) .................................... 15174707

(51) Int. Cl.
H04L 29/06 (2006.01)
H04W 8/12 (2009.01)
G06F 16/903 (2019.01)
(52) U.S. Cl.
CPC ...... *H04L 65/1016* (2013.01); *H04L 65/1073* (2013.01); *H04W 8/12* (2013.01); *G06F 16/903* (2019.01); *H04L 65/1069* (2013.01)

(58) Field of Classification Search
CPC ................................................. H04L 65/1016
See application file for complete search history.

(56) References Cited

U.S. PATENT DOCUMENTS

2006/0271693 A1* 11/2006 Thiebaut ................. H04W 8/12
709/229
2007/0139264 A1* 6/2007 Kangas ................... G01S 19/09
342/357.25
(Continued)

FOREIGN PATENT DOCUMENTS

EP 1715625 A1 10/2006

OTHER PUBLICATIONS

Discussion on S8HR VoLTE Roaming NTT Docomo S2-150985 TSG SA WG2 #108 San Jose Del Cabo, Mexico Apr. 13-17, 2015 (Year: 2015).*

(Continued)

*Primary Examiner* — Kevin M Cunningham

(57) ABSTRACT

A communication entity includes a Proxy Call Session Control Function (P-CSCF). The P-CSCF includes a transceiver and a controller. The transceiver is operable to receive a register request from a user equipment (UE) in a visited public land mobile network (VPLMN). The controller is operable to: retrieve a network identifier (PLMN ID) for the VPLMN by requesting the PLMN ID where the UE is currently located from a Policy Control Rule Function (PCRF); access a database to obtain a list of local emergency numbers for the VPLMN; and include the retrieved PLMN ID in the register request before forwarding the register request to a Call Session Control Function (CSCF).

8 Claims, 13 Drawing Sheets

(56) References Cited

U.S. PATENT DOCUMENTS

| | | |
|---|---|---|
| 2009/0298458 A1 | 12/2009 | Bakker et al. |
| 2010/0246780 A1 | 9/2010 | Bakker et al. |
| 2012/0221707 A1 | 8/2012 | Lindholm et al. |
| 2015/0312834 A1* | 10/2015 | Patil .................. H04W 36/0022 370/331 |
| 2018/0049010 A1* | 2/2018 | Lauster .................. H04W 4/90 |
| 2018/0063688 A1* | 3/2018 | Lindholm ............... H04W 4/90 |
| 2018/0176376 A1* | 6/2018 | Abe ....................... H04M 11/04 |
| 2018/0310162 A1* | 10/2018 | Kim ........................ H04W 8/06 |

OTHER PUBLICATIONS

SA WG2 Meeting #87, "NPLI and Geographical Identifier", Oct. 10-14, 2011, pp. 1-11, XP50549641A1.

SA WG2 Meeting #111, "Solution to Key Issue 2, Key Issue 3 and Key Issue 4", Oct. 19-23, 2015, pp. 1-5, XP51035248A1.

3GPP TS 23.228 V13.3.0 (Jun. 2015), $3^{rd}$ Generation Partnership; Technical Specification Group Services and System Aspects; IP Multimedia Subsystem (IMS); Stage 2 (Release 13), Jun. 2015, pp. 1-311.

3GPP TS 23.203 V13.3.0 (Mar. 2015), $3^{rd}$ Generation Partnership Project; Technical Specification Group Services and System Aspects; Policy and charging control architecture (Release 13), Mar. 2015, pp. 1-231.

3GPP TS 23.401 V13.3.0 (Jun. 2015), $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 13), Jun. 2015, pp. 1-324.

\* cited by examiner

COMMUNICATION SYSTEM

CROSS-REFERENCE TO PRIOR APPLICATIONS

This application is a U.S. National Stage Application under 35 U.S.C. § 371 of International Application No. PCT/EP2016/065446 filed on Jun. 30, 2016, and claims benefit to European Patent Application No. EP 15174707.8 filed on Jun. 30, 2015. The International Application was published in English on Jan. 5, 2017 as WO 2017/001640 A1 under PCT Article 21(2).

FIELD

The present invention relates to mobile communications devices and networks, particularly but not exclusively those operating according to the $3^{rd}$ Generation Partnership Project (3GPP) standards or equivalents or derivatives thereof, such as the Long Term Evolution (LTE) of UTRAN (called Evolved Universal Terrestrial Radio Access Network (E-UTRAN)). The invention has particular although not exclusive relevance to Voice over LTE (VoLTE) roaming and the provision of location information for an emergency call.

BACKGROUND

There have been discussions in the 3GPP about a Voice over LTE (VoLTE) roaming model called S8 Home Routed (S8HR), i.e. the roaming mobile device (User Equipment, UE) in the visited network uses the normal data roaming agreement with the home network operator via the S8 reference point and does not provide any IP multimedia core network subsystem (IMS) related infrastructure as in the normally considered roaming mode with the so called Local Breakout (LBO) in the visited network. An architecture that represents the S8HR roaming model is shown in FIG. 1.

In the S8HR architecture all data traffic, including VoLTE traffic, is routed directly inside a general packet radio service (GPRS) tunneling protocol (GTP) tunnel from a visited public land mobile network (VPLMN) to a public data network (PDN) gateway (PGW) in a home public land mobile network (HPLMN). The roaming agreements between VPLMN and HPLMN just need to take into consideration normal data roaming, since there is no special treatment of the data in the VPLMN and everything is forwarded to the PGW in the HPLMN.

For this reason it is difficult for the so called Proxy Call Session Control Function (P-CSCF) to detect a UE's location (including the current registered PLMN). At the P-CSCF it appears that the UE is always located in the HPLMN, since it gets the IP address from the PGW in the HPLMN. Usually in the LBO case, the P-CSCF is located in the same network as the UE, so the P-CSCF can retrieve and verify the location, which is not the case in the S8HR model. This problem is illustrated in FIG. 2.

Whilst the UE is able to provide location information to the P-CSCF in the P-Access-Network-Info header it is not mandatory for such location information to be provided by the UE. Moreover, even if the UE does provide such information, a disadvantage of such UE provided location information is that it may not be considered as trusted by the network, since it is included in the P-Access-Network-Info header by the UE and the UE may be compromised. Retrieving the wrong location information may have a severe impact to IMS services like emergency calls/sessions where the public safety answering point (PSAP) needs to know exactly from where the emergency call is setup, especially in case an end user is not sure, or is unable to explain, where that user is at the moment, e.g. when there has been accident on a highway or when the user is visiting a city that the user is not familiar with.

Another problem exists in the case when a UE is not able to detect, by itself, that the called number is an emergency number, leading to the call being treated as a normal call and not with the priority and special quality of service (QoS) required. Such incorrect treatment of an emergency call as a normal call could lead to a dropped call in special network situations such as network congestion scenarios. In such a situation the P-CSCF may not be able to detect that a dialed number is an emergency number without having missing context information for the currently serving network (i.e. the VPLMN). This issue was described in 3GPP change request CR0278 to Technical Standard 23.167, S2-150993, "Per-PLMN configuration in P-CSCF for Non UE Detectable Emergency Call Handling" presented at meeting 108 of the 3GPP SA Working Group 2 (13-18 Apr. 2015, San Jose Del Cabo, Mexico). A new study on the S8HR roaming model was initiated with the 3GPP 'Approval' document, S2-152061, "Study on S8 Home Routing Architecture for VoLTE" at meeting 109 of the 3GPP SA Working Group 2 (25-29 May 2015, Fukuoka, Japan).

Another general issue that exists with the current S8HR model is related to the fact that for charging (e.g. creating charging records in the various IMS nodes), the P-Visited-Network-ID header of the VPLMN is needed and required to be included by the P-CSCF, which is not possible with the current S8HR model.

Described herein are proposals that seek to provide improvements over current technology, for example by addressing, or at least partially alleviating, one or more of the above problems. The proposals include, for example, description of methods for avoiding the misinterpretation of emergency calls from roaming UEs in VPLMN using S8 Home routed traffic.

SUMMARY

In an embodiment, the present invention provides a communication entity including a Proxy Call Session Control Function (P-CSCF). The P-CSCF includes a transceiver and a controller. The transceiver is operable to receive a register request from a user equipment (UE) in a visited public land mobile network (VPLMN). The controller is operable to: retrieve a network identifier (PLMN ID) for the VPLMN by requesting the PLMN ID where the UE is currently located from a Policy Control Rule Function (PCRF); access a database to obtain a list of local emergency numbers for the VPLMN; and include the retrieved PLMN ID in the register request before forwarding the register request to a Call Session Control Function (CSCF).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
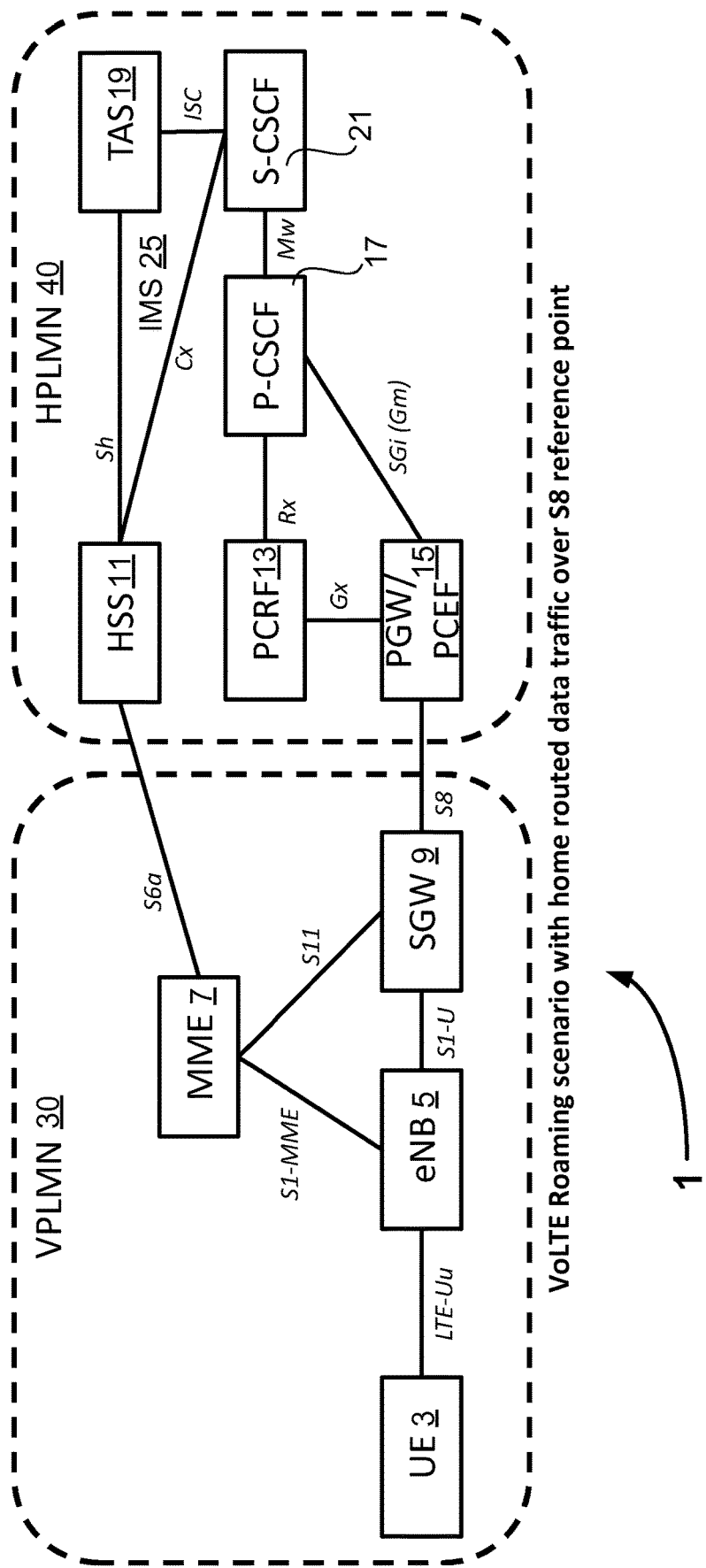
FIG. 1 schematically illustrates a telecommunication system.
Figure 2:
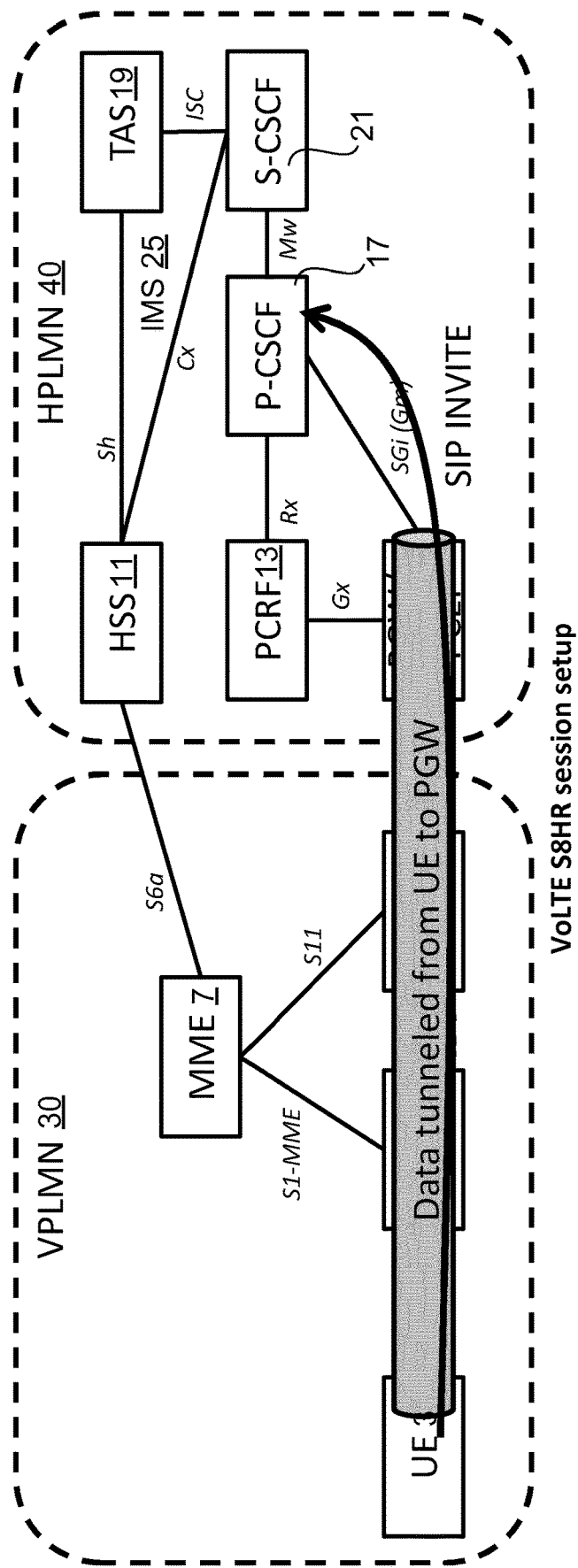
FIG. 2 schematically illustrates an exemplary implementation of the telecommunication system of FIG. 1 in which embodiments of the present invention may be used.

In one aspect of the invention there is provided a communication entity comprising a Proxy Call Session Control Function, P-CSCF, the P-CSCF comprising: a transceiver and a controller; wherein the transceiver is operable: to receive a register request from a user equipment, UE, in a visited public land mobile network, VPLMN; and wherein the controller is operable: to retrieve a network identifier, PLMN ID, for the VPLMN; to query a database for any local emergency number(s); and to include the PLMN ID for the VPLMN in a header and forward the register request to a Serving Call Session Control Function, S-CSCF.

In one aspect of the invention there is provided a communication entity comprising a Proxy Call Session Control Function, P-CSCF, the P-CSCF comprising: a transceiver and a controller; wherein the transceiver is operable: to receive an invite for a non UE detectable emergency call from a user equipment, UE, in a visited public land mobile network, VPLMN; and wherein the controller is operable: to detect that said call is an emergency call by performing a comparison of an identifier associated with said call with at least one local emergency numbers.

In one aspect of the invention there is provided a communication entity comprising a Proxy Call Session Control Function, P-CSCF, the P-CSCF comprising: a transceiver and a controller; wherein the transceiver is operable: to receive a register request from a user equipment, UE, in a visited public land mobile network, VPLMN; and wherein the controller is operable: to obtain a network identifier, PLMN ID, for the VPLMN from a policy control rule function; and to include the PLMN ID in a further register request message and to control the transceiver to send the further register request message to a node of an IP multimedia core network subsystem, IMS.

In one aspect of the invention there is provided a method performed by a communication entity comprising a Proxy Call Session Control Function, P-CSCF, the method comprising: receiving a register request from a user equipment, UE, in a visited public land mobile network, VPLMN; retrieving a network identifier, PLMN ID, for the VPLMN; querying a database for any local emergency number(s); and including the PLMN ID for the VPLMN in a header and forwarding the register request to a Serving Call Session Control Function, S-CSCF.

In one aspect of the invention there is provided a method performed by a communication entity comprising a Proxy Call Session Control Function, P-CSCF, the method comprising: receiving an invite for a non UE detectable emergency call from a user equipment, UE, in a visited public land mobile network, VPLMN; and detecting that said call is an emergency call by performing a comparison of an identifier associated with said call with at least one local emergency numbers.

In one aspect of the invention there is provided a method performed by a communication entity comprising a Proxy Call Session Control Function, P-CSCF, the method comprising: receiving a register request from a user equipment, UE, in a visited public land mobile network, VPLMN; obtaining a network identifier, PLMN ID, for the VPLMN from a policy control rule function; and including the PLMN ID in a further register request message and sending the further register request message to a node of an IP multimedia core network subsystem, IMS.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

FIG. 1 schematically illustrates a mobile (cellular) telecommunication system, generally at 1, in which a user of a mobile communication device 3 (denoted 'UE' in FIG. 1) can communicate with other users via one or more base stations 5. In the system illustrated in FIG. 1, the base station 5 shown is an Evolved Universal Terrestrial Radio Access Network (E-UTRAN) base station. Such base stations are commonly referred to as eNBs (Evolved NodeBs). The user of the mobile communication device 3 can roam between public land mobile networks 30, 40 (PLMNs).

As those skilled in the art will appreciate, whilst one mobile device 3 and one base station 5 are shown in FIG. 1 for illustration purposes, the system, when implemented, will typically include other base stations and mobile devices.

The PLMNs 30, 40 include the user's home network 40, which is referred to as a home public land mobile network (HPLMN), although in this example, the user is currently roaming and is located in a visited public land mobile network 30 (VPLMN), and hence the user's UE 3 is served by a base station 5 of the VPLMN 30 via an appropriate interface (in this example an air interface referred to as the 'LTE-Uu' or simply 'Uu' interface).

The base station 5 has a communication interface via which it can communicate with core network entities 7, 9 of the VPLMN 30. In this example, the core network entities 7, 9 are shown to include a mobility management entity (MME) 7 and a serving gateway (SGW) 9 but will typically include other entities. The communication interface provides an S1-MME logical interface (or 'reference point') and an S1-U logical interface (or 'reference point') respectively for communicating with the MME 7 and the SGW 9.

The MME 9 is the network node responsible for keeping track of the locations of mobile devices within the corresponding network (in this example the visited network). To assist the MME 9 to keep track of the mobile device, the MME 7 communicates with a home subscriber server (HSS) 11 in the home network 40 via an associated interface (in this example the 'S6a' interface/reference point). The HSS 11 comprises a database that contains user-related and subscriber-related information. It also provides support functions (e.g. to the MME 9) in mobility management, call and session setup, user authentication, and access authorisation.

The SGW 9 operates as a gateway for communication between the base station 5 of the VPLMN 30 and the HPLMN 40. To support this communication, the SGW 9 has an interface (e.g. an 'S8' interface/reference point) for communication with a public data network (PDN) gateway (PGW)/policy control enforcement function (PCEF) 15 in the HPLMN 40.

The PGW/PCEF 15 interfaces with a policy and charging rules function (PCRF) 13 in the core network of the HPLMN 40 (e.g. via a 'Gx' interface/reference point).

The PCRF 13 provides network control regarding service data flow detection, gating (blocking or allowing packets), quality of service (QoS) control and flow-based charging towards the PCEF 15. The PCRF 13 plays a key role as a mediator of network resources for an IP Multimedia System's (IMS's) network for establishing calls and allocating requested bandwidth to a call bearer with configured attributes.

The PCRF 13 communicates with a call session control function, in this example a proxy call session control function (P-CSCF) 17 of an IMS 25. The P-CSCF 17 is a session initiation protocol (SIP) proxy that effectively acts as the entry point to the IMS domain and serves as the outbound proxy server for the UE 3. The UE 3 attaches to the P-CSCF 17 prior to performing IMS registrations and initiating SIP sessions. The P-CSCF 17 interacts with a Serving CSCF (S-CSCF) 21 in the IMS 25 core network (e.g. via an 'Mw' interface/reference point).

The S-CSCF 21 acts as a registrar server, and in some cases as a redirect server and is effectively the central point for IMS service control over a so called 'ISC' interface/reference point with a telephony application server (TAS) 19 (sometimes referred to as an application server, 'AS'). The S-CSCF 21 facilitates the routing path for mobile originated or mobile terminated session requests. During IMS registrations, the S-CSCF 21 can query the HSS 11 (e.g. via a 'Cx' interface/reference point) to obtain UE related information (e.g. authentication information).

An Interrogating CSCF (I-CSCF) may be located between the P-CSCF 17 and the S-CSCF 21 and communicate with them both (via respective 'Mw' interfaces/reference points). The I-CSCF acts as an inbound SIP proxy server in the IMS 25. During IMS registrations, the I-CSCF can query the HSS 11 to select the appropriate S-CSCF which can serve the UE 3. During IMS sessions, the I-CSCF acts as the entry point to terminating session requests and routes the incoming session requests to the correct S-CSCF of the called party.

Beneficially, the telecommunication system of FIG. 1 implements one or more advantageous procedures for addressing, or at least partially alleviating, the issue of unsuccessful or dropped emergency calls when a UE 3 is roaming, away from the HPLMN 40, in the VPLMN 30.

In a first particularly beneficial example, a 'proactive' procedure is implemented that targets the IMS registration procedure in an attempt to prevent the issue from occurrence.

In a second particularly beneficial example, a 'reactive' procedure is implemented that targets the establishment of an IMS session with a view to reduce the signalling overhead during attempted emergency call establishment. This procedure can be used in isolation, or in combination with the first example, when the first example has not been sufficient to prevent non UE detectable emergency calls from happening.

In a third particularly beneficial example, a procedure is implemented that targets part of an IMS Registration procedure in which an I-CSCF queries the HSS 11 in order to retrieve the S-CSCF assignment. Since the HSS 11 knows in which PLMN the UE 3 is roaming, the HSS 11 is able to include a current PLMN ID (e.g. the VPLMN ID) in the answer back to the I-CSCF, e.g. in a P-Visited-Network-ID header. In a variant of this third example, at a later step, when the S-CSCF 21 queries the HSS 11 for authentication data, the HSS 11 can include the VPLMN ID in the answer to the S-CSCF 21.

These three exemplary procedures will now be described in more detail, by way of example only with reference, in particular, to FIGS. 3 to 6.

Example 1: Prevention of Non UE Detectable Emergency Call (Proactive Procedure)

The proactive procedure, of the first example, aims to take an action at a time when the UE 3 attaches to the VPLMN 30, e.g. when a user crosses a country border, or arrives in another country and turns on the mobile phone (UE) 3 at the airport.

Figure 3:
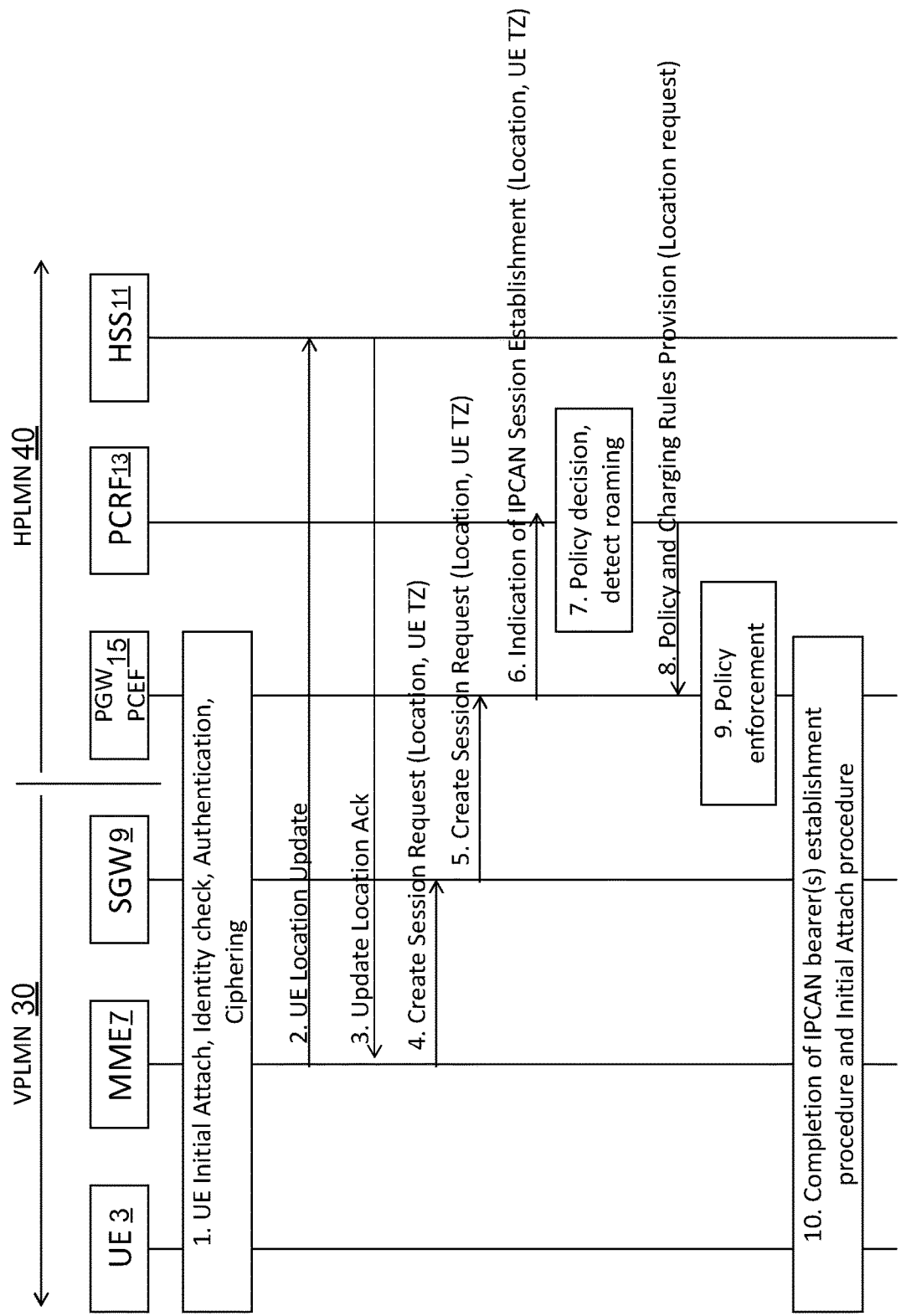
FIG. 3 is an exemplary timing diagram illustrating the steps performed during initial attach to the VPLMN of FIG. 1.

FIG. 3—Initial Attach in VPLMN

FIG. 3 shows the basic approach for the Initial Attach in the VPLMN 30. This procedure may also be used as the basis for the second example, e.g. when these proactive measures do not work with the UE 3. The procedures of the first and second examples may, nevertheless, be performed independently and do not need to be combined.

The procedure illustrated in FIG. 3 will now be described in more detail, by way of example only. It will be appreciated that whilst an exemplary procedure having specific steps is described in detail, not every step is essential to achieve the (or at least some of the) specific benefits of this example. Moreover, whilst the steps are often described with reference to specific commands and/or protocols it will be appreciated that corresponding functionality could be achieved with different commands, parameters and/or protocols.

Step 1: The UE 3 performs the Initial Attach according to 3GPP TS 23.401 v13.3.0 with e.g. Identity Check, Authentication.

Step 2: The MME 7 sends an Update Location Request (MME Identity, IMSI, ME Identity (IMEISV), MME Capabilities, ULR-Flags, Homogeneous Support of IMS Voice over PS Sessions, UE SRVCC capability, equivalent PLMN list) message to the HSS.

Step 3: The HSS 11 acknowledges the Update Location message by sending an Update Location Acknowledgement (IMSI, Subscription data) message to the new MME 7. The subscription data may contain one or more PDN subscription contexts. Each PDN subscription context contains an 'EPS subscribed QoS profile' and the subscribed APN-AMBR.

Step 4: If the UE 3 does not provide an APN, the MME 7 shall use the PGW 15 corresponding to the default APN for default bearer activation. If the selected PDN subscription context contains no PGW identity the new MME 7 selects a PGW 15. The MME 7 selects an SGW 9 and allocates an EPS Bearer Identity for the Default Bearer associated with the UE 3. The MME 7 then sends a message, to the selected SGW 9, to initiate creation of a session—e.g. a Create Session Request including, for example, one or more of the following: International Mobile Subscriber Identity (IMSI), International Mobile Subscriber Identity (IMSI), MME Tunnel Endpoint IDentifier (TEID) for control plane, PDN GW address, PDN Address, Access Point Name (APN), Radio Access Technology (RAT) type, Default Evolved Packet System (EPS) Bearer Quality of Service (QoS), PDN Type, APN Aggregate Maximum Bit-Rate (APN-AMBR), EPS Bearer Identity, Protocol Configuration Options, Handover Indication, Mobile Equipment (ME) Identity (e.g. International Mobile Station Equipment Identity Software Version, 'IMEISV'), User Location Information (e.g. E-UTRAN Cell Global Identifier, 'ECGI'), UE Time Zone, User Closed Subscriber Group (CSG) Information, MS Info Change Reporting support indication, Selection Mode, Charging Characteristics, Trace Reference, Trace Type, Trigger Id, Operation and Maintenance Center (OMC) Identity, Maximum APN Restriction, Dual Address Bearer Flag, the Protocol Type over S5/S8, Serving Network.

Step 5: The SGW 9 creates a new entry in its EPS Bearer table and sends a message, to the PGW 15, to initiate creation of the requested session—e.g. a Create Session Request including, for example, one or more of the following: IMSI, MSISDN, APN, Serving GW Address for the user plane, Serving GW TEID of the user plane, Serving GW TEID of the control plane, RAT type, Default EPS Bearer QoS, PDN Type, PDN Address, subscribed APN-AMBR, EPS Bearer Identity, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger Id, OMC Identity, Maximum APN Restriction, Dual Address Bearer Flag, Serving Network.

Step 6: The PGW 15 performs an IP-Connectivity Access Network (IP-CAN) Session Establishment procedure as defined in 3GPP TS 23.203 v13.4.0. The PCEF 15 informs the PCRF 13 of the IP-CAN Session establishment. The PCEF 15 starts a new Gx session by sending a DIAMETER CCR to the PCRF 13 using the CC-Request-Type Attribute Value Pair (AVP) set to the value INITIAL_REQUEST. The PCEF 15 provides UE identity information, PDN identifier, the UE Internet Protocol version 4 (IPv4) address and/or UE Internet Protocol version 6 (IPv6) prefix and, if available, the PDN connection identifier, IP-CAN type, RAT type and/or the default charging method and additional charging parameters and may send charging characteristics if available. The PCEF 15 provides, when available, the Default-EPS-Bearer-QoS and the APN-AMBR to the PCRF 13. The PCEF 15 may also include the Access Network-Charging-Address and Access Network-Charging-Identifier-Gx AVPs, the SGSN address within either 3GPP-SGSN-Address AVP or 3GPP-SGSN-Ipv6-Address AVP, the user location information within 3GPP-User-Location-Info, the Routing Area Identity (RAI) within RAI AVP, the PLMN id within the 3GPP-SGSN-MCC-MNC AVP, the information about the UE 3 within User-Equipment-Info AVP, AN-Trusted AVP if available and the charging characteristics within 3GPP-Charging-Characteristics AVP in the credit control request (CC-Request).

Step 7: The PCRF 13 makes the authorization and policy decision and selects or generates PCC Rule(s) to be installed. In addition, in this example, the PCRF 13 detects that the UE 3 is roaming and stores the serving PLMN ID or Mobile Country Code (MCC), and user location information for an upcoming Rx request. Beneficially this allows the PCRF 13 to know if the UE 3 is roaming in a VPLMN 30 and to take proactive action to avoid, or alleviate potential issues with, attempts to establish non UE detectable emergency call via the VPLMN 30.

Step 8: The PCRF 13 provisions the PCC Rules to the PCEF 15 e.g. using a DIAMETER Credit-Control Application (CCA). In addition, the PCRF 13 requests the PCEF/PGW 15 to send an update about the UE location information whenever the PCEF/PGW 15 detects UE location change. In particular, when the UE 3 is in the VPLMN 30, the PCRF 13 includes in the DIAMETER message (e.g. Credit-Control-Answer (CCA) and Re-Authorization-Request (RAR) commands) the ACCESS_NETWORK_INFO_REPORT AVP or 3GPP-SGSN-MCC-MNC AVP (or any other suitable AVP) to indicate that the PCRF 13 requests updated access network information so that it can provide accurate location information to the Application Function (AF) session, at setup time e.g. at UE's IMS registration. Beneficially this helps to ensure that the PCRF 13 is kept updated when the UE 3 roams to, and between, VPLMNs 30. Thus, the PCRF 13 is able to take proactive action to avoid, or alleviate potential issues with, attempts to establish non UE detectable emergency call via the VPLMN 30.

Step 9: The PCEF enforces the decision.

Step 10: The remaining steps of the IP CAN bearer establishment procedure of TS 23.203 v13.4.0 and the Initial Attach procedure of TS 23.401 v13.3.0 are executed In essence, in this example, the modifications to the PCRF 13 and PCEF/PGW 15 functionality as described in FIG. 3 are mainly related to the storage, updating and processing of UE's location information in the PCRF 13. In particular the PCRF 13 is capable of detecting that the UE 3 is roaming and is registered via a particular VPLMN 30.

Figure 4:
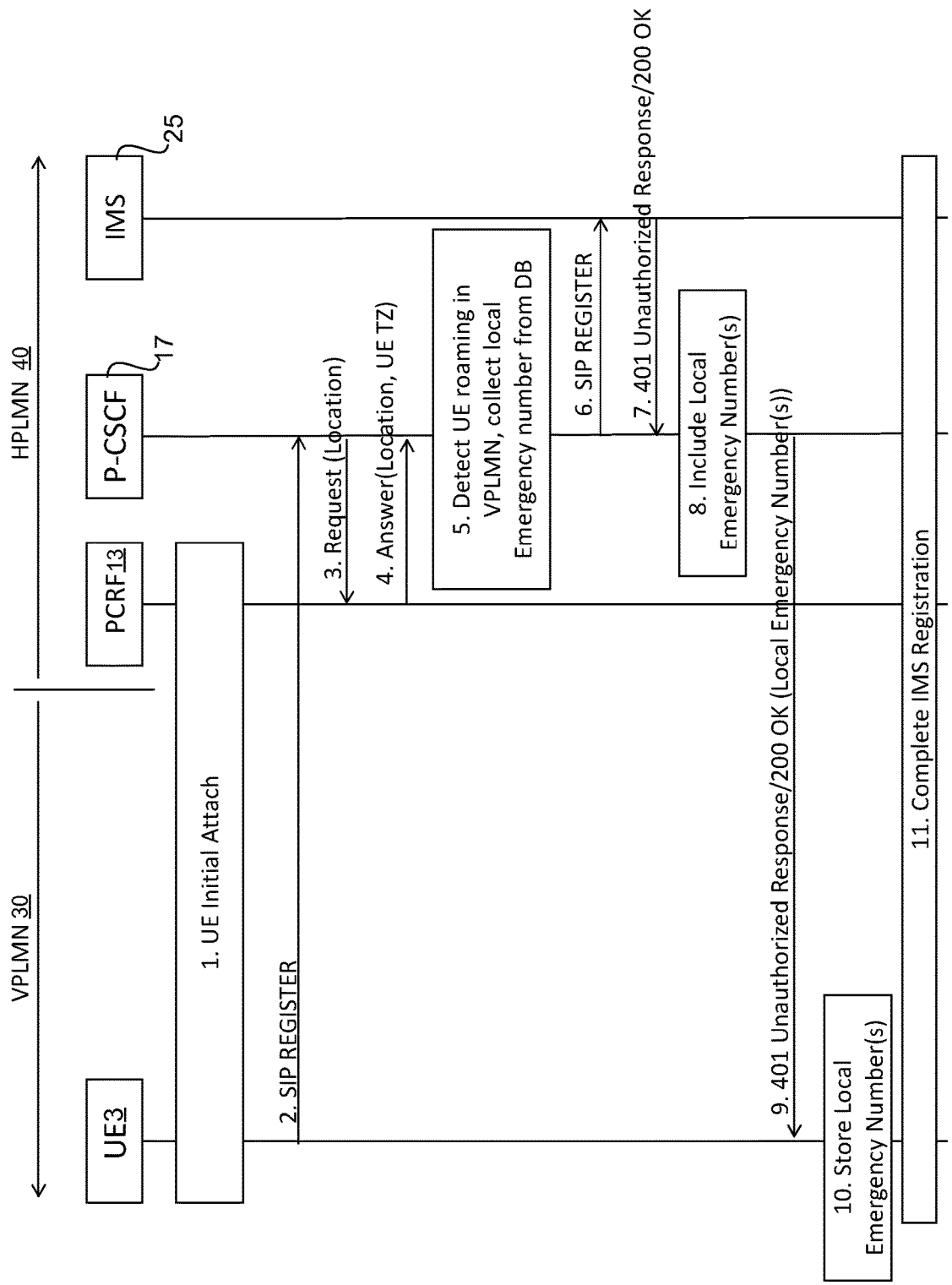
FIG. 4 is an exemplary timing diagram illustrating the steps performed for provisioning a local emergency number at IMS registration in the system of FIG. 1.

FIG. 4—Local Emergency Number Provisioning at IMS Registration

In order to detect the local emergency numbers in the UE 3, the UE 3 may retrieve them from the IP-CAN. The UE 3 may not, however, receive any emergency numbers from the IPCAN in the VPLMN 30. In order to provide the UE 3 with a list of the local emergency numbers in case of the S8 home routed roaming scenario, the HPLMN 40, of this example, can advantageously detect the VPLMN 30 and its local emergency numbers.

FIG. 4 illustrates an exemplary procedure in which the P-CSCF 17 of the HPLMN 40 can request the latest available UE location information, possibly taking into account the procedures, described above with reference to FIG. 3, at the time of IMS Registration.

The procedure illustrated in FIG. 4 will now be described in more detail, by way of example only. It will be appreciated that whilst an exemplary procedure having specific steps is described in detail, not every step is essential to achieve the (or at least some of the) specific benefits of this example. Moreover, whilst the steps are often described with reference to specific commands and/or protocols it will be appreciated that corresponding functionality could be achieved with different commands, parameters and/or protocols.

Step 1: The UE 3 performs an Initial Attach in the VPLMN 30, for example according to the call flow of FIG. 3.

Step 2: The UE 3 registers to IMS and sends a SIP REGISTER request to the P-CSCF 17 in the HPLMN 40.

Beneficially, the P-CSCF 17 then obtains location information, such as a (V)PLMN ID, so that it is able to determine the local emergency numbers associated with the identified location (e.g. VPLMN).

Step 3: In FIG. 4, for example, when receiving the SIP REGISTER, the P-CSCF 17 establishes a Rx session and performs an Rx request to the PCRF 13 in order to retrieve the latest location information of the UE 3. This can be a one-time request. Additionally the P-CSCF 17 can request notification from PCRF 13 when the UE location changes. The request message can be a new or extended existing DIAMETER or other protocol message to the PCRF 13.

Step 4: The PCRF 13 fetches the latest UE location information and maybe also the UE timezone information and provides them in an Rx Answer back to the P-CSCF 17. The UE location information contains at least the PLMN Id or MCC of the serving (V)PLMN. This answer message can be a new or extended existing DIAMETER or other protocol message to the P-CSCF. Beneficially, therefore, the P-CSCF 17 then has knowledge of the UE's location (e.g. VPLMN) on which to base a determination of the associated local emergency numbers.

Step 5: The P-CSCF 17 detects that the UE is roaming in the VPLMN 30 and queries the local emergency number(s) from a connected Database (DB). Beneficially, therefore, the P-CSCF 17 then has knowledge of the emergency numbers associated with the VPLMN. Step 6: The P-CSCF 17 forwards the SIP REGISTER request to the next IMS node 25 (S/I-CSCF and HSS). The P-CSCF 17 may perform the steps 3 and 5 in parallel. The P-CSCF 17 may beneficially insert the P-Visited-Network-ID header.

Step 7: The IMS nodes answer with a 401 Unauthorized response or later in the procedure in the 200 OK.

In this example, the local emergency numbers are then provided to the UE 3 to help the UE 3 to avoid attempts to establish a non UE detectable emergency call via the VPLMN 30 although it will be appreciated that the local emergency numbers may not be forwarded and be simply be retained for use in identifying UE attempts to establish a non UE detectable emergency call via the VPLMN 30.

Step 8: In this example, however, the P-CSCF 17 includes the local emergency number(s) in the SIP answer message from the IMS nodes, e.g. in a new header field in the SIP message or as an extension to any existing one.

Step 9: The P-CSCF 17 forwards the SIP message to the UE 3 including the local emergency numbers. Alternatively, or additionally, the local emergency number(s) could be included in any (following) SIP message to the UE 3.

Step 10: The UE 3 detects the local emergency number(s) and stores them in case they are used by the subscriber while roaming in this PLMN.

Step 11: The IMS registration is completed as described in TS 23.228 v 13.3.0.

Example 2: Detection of Non UE Detectable Emergency Call at the P-CSCF Based on Location Information from the Network One problem that may arise with the exemplary procedures of FIG. 4 occurs when the UE 3 is not able to detect the SIP header extensions proposed in step 9 and discards the information about the local emergency numbers at the time of IMS registration. Then, when the user is dialing the local emergency number, the UE is not able to map it to the emergency Uniform Resource Name (URN) and therefore the UE 3 attempts to establish a non UE detectable emergency call by setting up a normal SIP INVITE without the priority/QoS of an emergency session.

Figure 5:
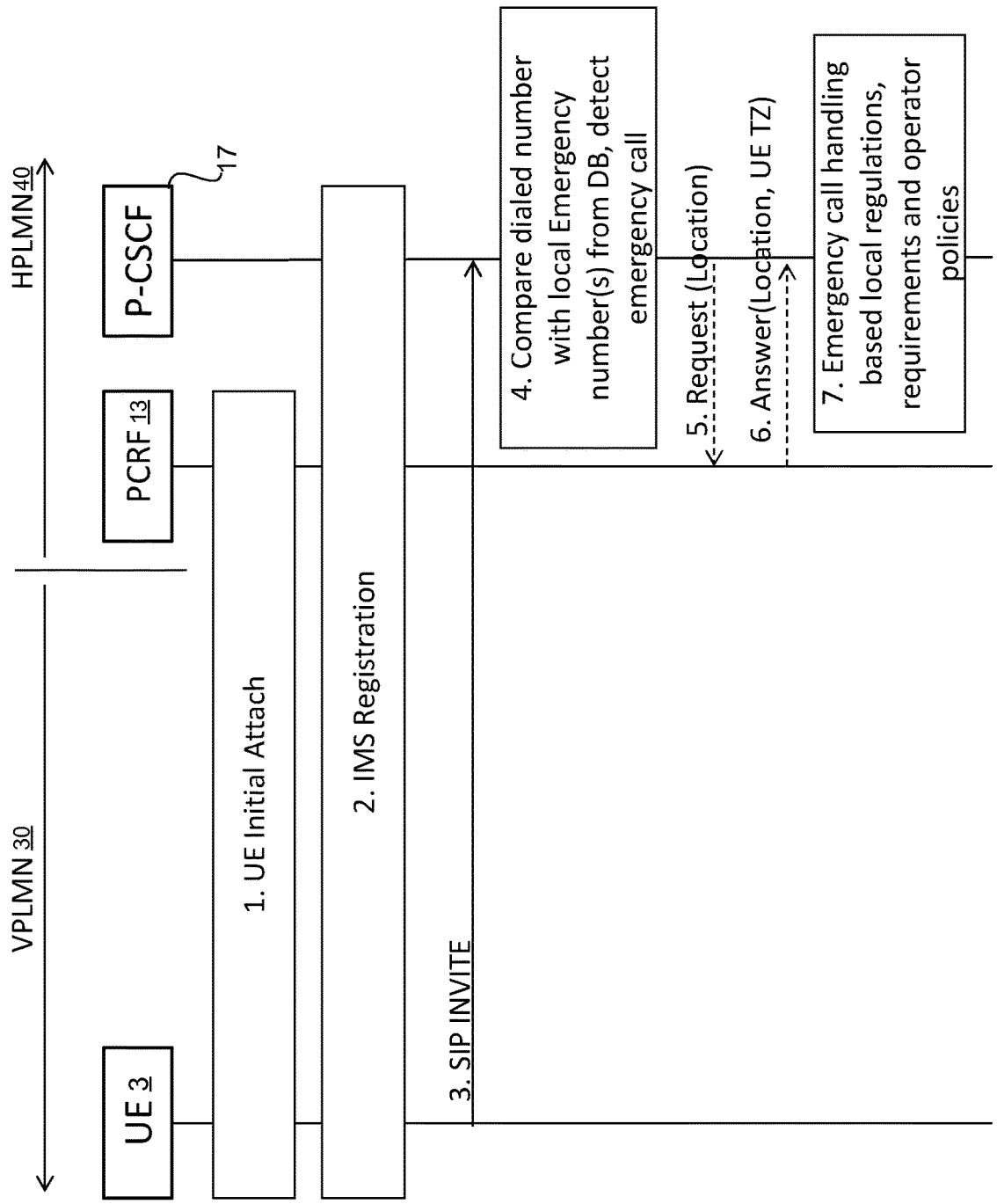
FIG. 5 is an exemplary timing diagram illustrating the steps performed during a non UE detectable emergency call in the system of FIG. 1.

FIG. 5—Non UE Detectable Emergency Call

In order to detect this potential situation as well, the P-CSCF 17 may beneficially be tasked to do a check based on the local emergency numbers downloaded for this UE 3 from the database.

The call flow for this exemplary procedure is illustrated in FIG. 5.

The procedure illustrated in FIG. 5 will now be described in more detail, by way of example only. It will be appreciated that whilst an exemplary procedure having specific steps is described in detail, not every step is essential to achieve the (or at least some of the) specific benefits of this example. Moreover, whilst the steps are often described with reference to specific commands and/or protocols it will be appreciated that corresponding functionality could be achieved with different commands, parameters and/or protocols.

Step 1: The UE 3 performs an Initial Attach in the VPLMN 30 according to the call flow of FIG. 3.

Step 2: The UE 3 performs an IMS registration, for example according to the call flow of FIG. 4 or according to another call flow in which does not involve the provision of local emergency numbers. However, in this example the UE 3 is unable to detect the local emergency numbers either because the UE 3 is not enhanced to understand the SIP extension with the local emergency numbers of FIG. 4, step 9 or because local emergency numbers are not provided during IMS registration.

Step 3: Accordingly, because the UE 3 cannot determine what the local emergency numbers are, when the user dials a local emergency number, the UE 3 does not detect it and therefore setups a normal SIP INVITE.

Step 4: The P-CSCF 17 compares the dialed number in the destination ('to') field of the SIP INVITE header with the local emergency numbers of the VPLMN 30 and detects the non UE detectable emergency call. The local emergency numbers may be compared with the dialed number using any suitable format, typically for example an E-164 number, a tel-URI or a SIP URI or any other format (e.g. URN). Beneficially, therefore, the P-CSCF 17 is able to take action in dependence on whether or not the dialed number is a local emergency number.

Step 5: If the P-CSCF 17 did not subscribe to location information updates at the time of the IMS registration, it may query the PCRF 13 for updated location information.

Step 6: The PCRF 13 answers the P-CSCF 17 once it received the updates location information if queried in step 5.

Step 7: The P-CSCF 17 may decide on further handling of the emergency call based on local regulations, requirements and operator policies. Possibilities may be:

a) reject the SIP INVITE, inform the UE 3 about the emergency call and direct the call to CS;

b) select an emergency CSCF (E-CSCF) in the VPLMN 30 based on the retrieved location information from a database and reroute the session to the selected CSCF in the VPLMN 30 including the location information in order to enable the selected CSCF to select the right public-safety answering point (PSAP); and/or c) if the VPLMN 30 provides IMS voice services, but no IMS roaming agreement is in place, the P-CSCF 17 in the HPLMN 40 could reject the SIP INVITE. The HPLMN 40 may then inform the UE 3 about the emergency call and may provide a local P-CSCF 17 in the VPLMN 30. The UE 3 then could initiate an unauthorized IMS emergency registration to the P-CSCF 17 and E-CSCF and perform an emergency call locally.

Example 3: Providing VPLMN ID During IMS Registration from the HSS

This exemplary procedure may be autonomous to the previously described example 1 and only relies on the stored data in the HSS 11. Example 2 may still be applicable as a backup, for example, if the UE 3 does not detect the local emergency numbers.

Figure 6:
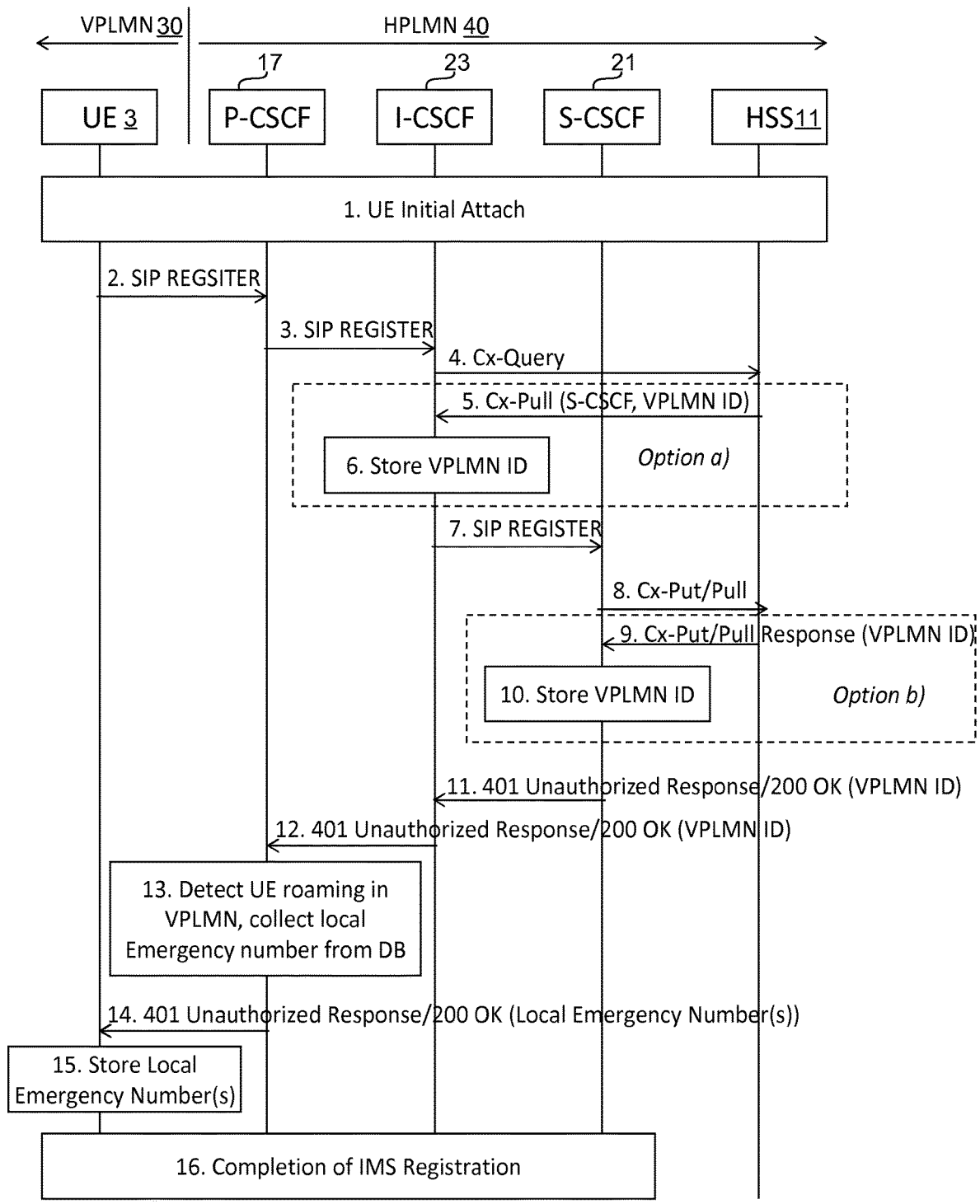
FIG. 6 is an exemplary timing diagram illustrating the steps performed for provisioning a VPLMN identifier during IMS registration in the system of FIG. 1.

FIG. 6—Providing VPLMN ID During IMS Registration

In this example, since the UE 3 has performed an Initial Attach in the roaming VPLMN 30, the HSS 11 is aware in which network and country the UE 3 is located. Based on this knowledge, the HSS 11 could provide the VPLMN ID or only MCC to the IMS in various messages during the IMS Registration procedure. Examples of how the HSS 11 may provide the information to an appropriate CSCF (e.g. I-CSCF and/or S-CSCF) are shown in FIG. 6.

The procedure illustrated in FIG. 6 will now be described in more detail, by way of example only. It will be appreciated that whilst an exemplary procedure having specific steps is described in detail, not every step is essential to achieve the (or at least some of the) specific benefits of this example. Moreover, whilst the steps are often described with reference to specific commands and/or protocols it will be appreciated that corresponding functionality could be achieved with different commands, parameters and/or protocols.

Step 1: The UE 3 performs an Initial Attach in the VPLMN 30.

Step 2: The UE 3 sends a SIP REGISTER message to the P-CSCF 17 in the HPLMN 40.

Step 3: The P-CSCF 17 forwards the SIP REGISTER to an I-CSCF 23 (where the I-CSCF 23 is present).

Step 4: If dynamic S-CSCF assignment is used, the I-CSCF 23 would perform a DIAMETER Cx-query to the HSS 11 to retrieve the S-CSCF address.

Step 5: The HSS 11 provides the S-CSCF address and, in illustrated 'Option a)', the VPLMN ID for the VPLMN 30 in which the UE 3 is located.

Step 6: Further, in illustrated 'Option a)', the I-CSCF 23 stores the VPLMN ID.

Step 7: The I-CSCF 23 then sends the SIP REGISTER to the S-CSCF 21. The I-CSCF may include, where it has received the VPLMN ID according to 'Option a)', the VPLMN ID (e.g. in the form of a P-Visited-Network-ID or similar header).

Step 8: The S-CSCF 21 sends a Cx-Put/Cx-Pull to the HSS 11.

Step 9: The HSS 11 sends a Cx-Put/Cx-Pull Response to the S-CSCF 21. If not performed in step 5, for illustrated 'Option a)', the HSS 11 may provide the VPLMN ID to the S-CSCF 21 as illustrated for 'Option b)'.

Step 10: Further, in illustrated 'Option b)', the S-CSCF 21 stores the VPLMN ID and may use it for service control. The S-CSCF 21 may include it in any SIP message (e.g. in the form of a P-Visited-Network-ID header or similar header).

Step 11: The S-CSCF answer to the SIP REGISTER with a 401 Unauthorized response or later in the procedure in the 200 OK and includes the VPLMN ID (e.g. in the form of a P-Visited-Network-ID header or similar header) if available (e.g. if obtained according to illustrated 'Option b)').

Step 12: The I-CSCF 23, where present, forwards the SIP message from the S-CSCF 21 and, if not already included and if received in step 5 or 11, the I-CSCF 23 includes the VPLMN ID (e.g. in the form of a P-Visited-Network-ID header or similar header).

Step 13: The P-CSCF 17 detects that the UE 3 is roaming in the VPLMN 30 and queries the local emergency number(s) from a connected Database (DB).

Step 14: The P-CSCF 17 forwards the SIP message to the UE 3 including the local emergency numbers. The local emergency number(s) could be included in any (following) SIP message to the UE 3.

Step 15: The UE 3 detects the local emergency number(s) and stores them in case they are used by the subscriber while roaming in this PLMN.

Step 16: The IMS registration is completed as described in TS 23.228 v13.3.0.

The exemplary procedures described in detail above may be summarised as follows:

1) Provisioning the UE's serving PLMN ID or MCC to the P-CSCF 17
   a. Via the PCRF (Example 1):
      i) Detecting, in the PCRF 13, UE roaming status for home routed traffic and storing this information until an Rx request from the P-CSCF 17 (e.g. SIP REGISTER, INVITE etc.).
      ii) The PCRF 13 requesting a change of location update from the PCEF 15 to provide updated location information in case the Rx request may be late in terms of time.
      iii) At the time of incoming SIP REGISTER at the P-CSCF 17, the P-CSCF 17 requesting stored location information from the PCRF 13.
   b. ViaHSS (Example 3):
      iv) Providing the VPLMN ID or MCC via the HSS 11 at IMS Registration here either via I-CSCF 23 or S-CSCF 21 or any other means.
2) Resolve local emergency numbers in the P-CSCF 17 e.g. by means of a database, using the received location information.
3) Provide the local emergency numbers to the UE 3 in a new or existing SIP header in any mobile terminated (MT) SIP message.
4) The UE 3 detects the new local emergency numbers in the SIP extensions and stores them
5) In case of non UE detectable emergency call (Example 2), the P-CSCF 17 compares the dialed number with the local emergency numbers of the VPLMN 30 and detects the emergency call.
6) Handling of the detected emergency call by rerouting to a local emergency CSCF in the VPLMN 30 or rejecting the SIP INVITE by providing the VPLMN P-CSCF address and pointing the UE 3 to do an unauthorized emergency registration.
7) Including the P-Visited-Network-ID header in SIP signalling.

It can be seen, therefore, that the above exemplary methods include, in particular, the beneficial steps of:
1) Detection of roaming situation of a UE 3 in the P-CSCF 17 by providing the VPLMN ID or MCC either via PCRF 13 or via HSS 11 to the P-CSCF 17.
2) Resolution of Local Emergency Numbers (e.g. E164 numbers, tel-URIs, URIs, URNs etc.) based on VPLMN ID in a DB at the P-CSCF 17.
3) Provisioning of Local Emergency Numbers to the UE 3 via SIP Signalling in any SIP message Advantages It can be seen therefore that the above alleviates issues associated with the undesirable setting up of a normal call (e.g. for a roaming UE), instead of an emergency when the UE is not otherwise able to detect that the called number is an emergency number.

Apparatus (Applicable to all Examples)

Figure 7:
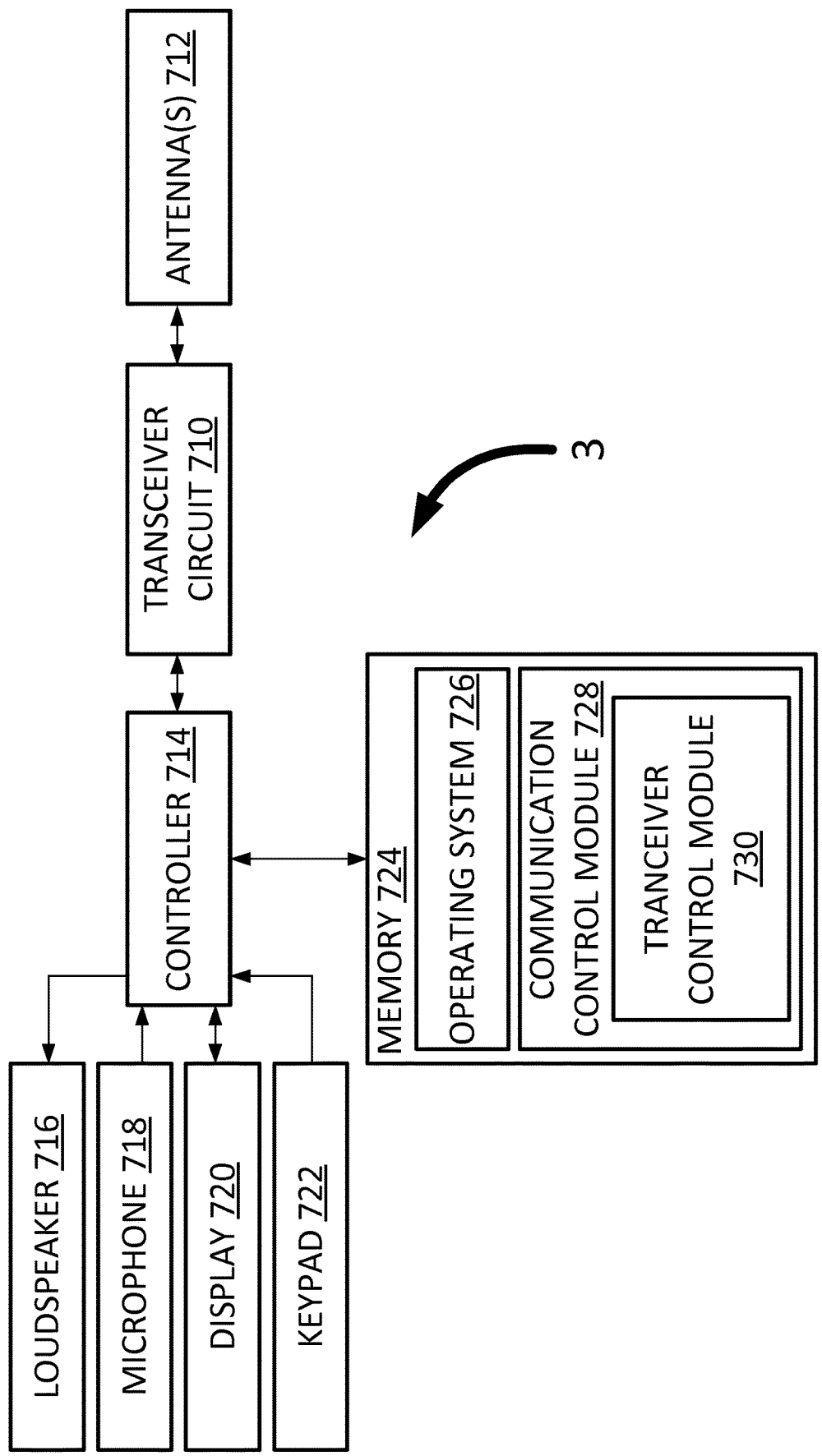
FIG. 7 shows a simplified block diagram of a mobile communication device for the telecommunication system of FIG. 1.

FIG. 7 is a block diagram illustrating the main components of the UE (e.g. a mobile telephone). As shown, the UE include transceiver circuit 710 that is operable to transmit signals to and to receive signals from the base station 5 via one or more antennas 712. As shown, the UE also includes a controller 714 which controls the operation of the UE and which is connected to the transceiver circuit 710 and to a loudspeaker 716, a microphone 718, a display 720 and a keypad 722. The controller operates in accordance with software instructions stored within a memory 724. As shown, these software instructions include, among other things, an operating system 726 and a communications control module 728 that includes at least a transceiver control module 730. The communications control module is operable to control communications with the base station. The transceiver control module 730 is responsible for identifying the parts of the transceiver circuit that can perform UE initial Attach, IMS Registration and transmission of SIP messages e.g. SIP INVITE. The controller 714 can perform identity check, authentication and ciphering etc. Also, the memory can store local emergency number(s), received via a SIP message from the P-CSCF 17, e.g. in a 200 OK or a 401 Unauthorized Response.

Figure 8:
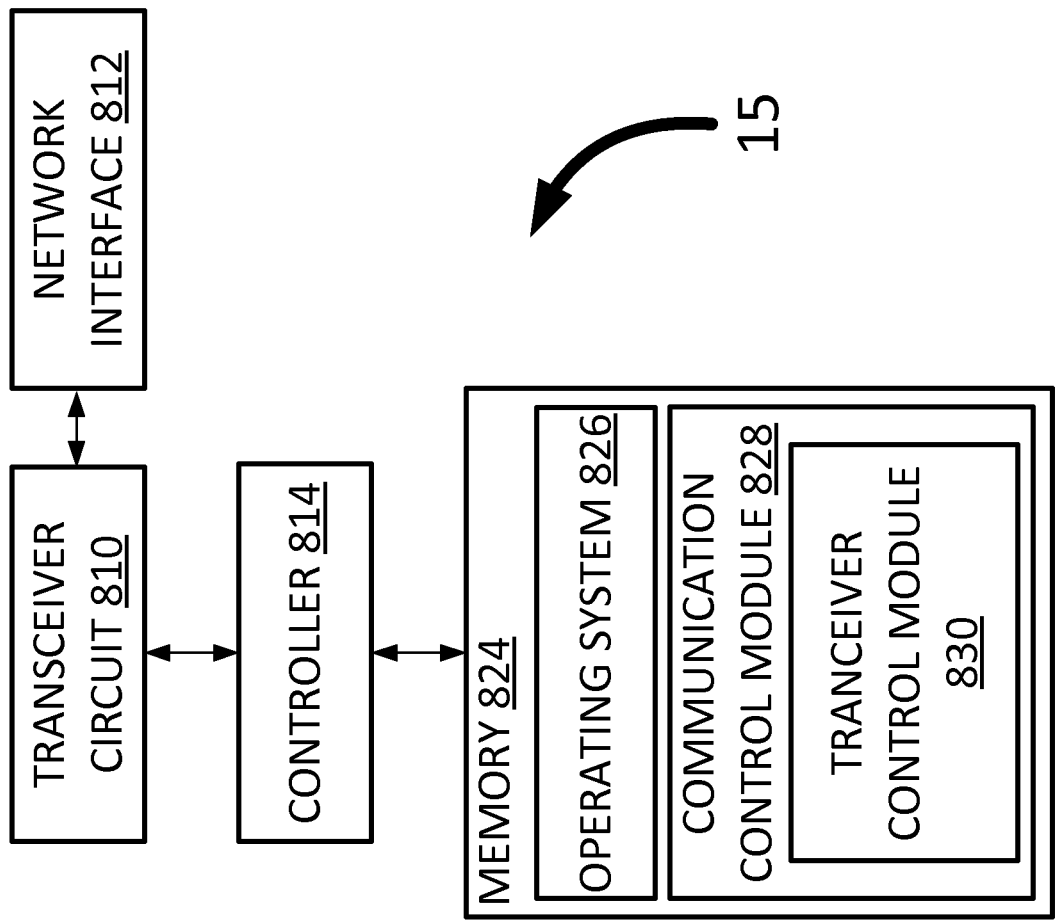
FIG. 8 shows a simplified block diagram of a PGW (PCEF) for the telecommunication system of FIG. 1.

FIG. 8 is a block diagram illustrating the main components of the P-GW(PCEF) 15. As shown, the P-GW(PCEF) 15 includes transceiver circuit 810 which is operable to transmit signals to and to receive signals from the connected node(s) via a network interface 812 (e.g. including the Gx interface). A controller 814 controls the operation of the transceiver circuit 810 in accordance with software stored in a memory 824. The software includes, among other things, an operating system 826 and a communications control module 828 having at least a transceiver control module 830. The communications control module 828 is operable to control generation of messages for communication with other entities and the related transmission of those messages, including the generation of the indication of IPCAN session Establishment which includes location information. The communications control module 828 is also responsible for signalling, to the PCRF 13, the indication of IPCAN session Establishment. The communications control module 828 is also responsible, amongst other things, for receiving policy and charging rules provision.

Figure 9:
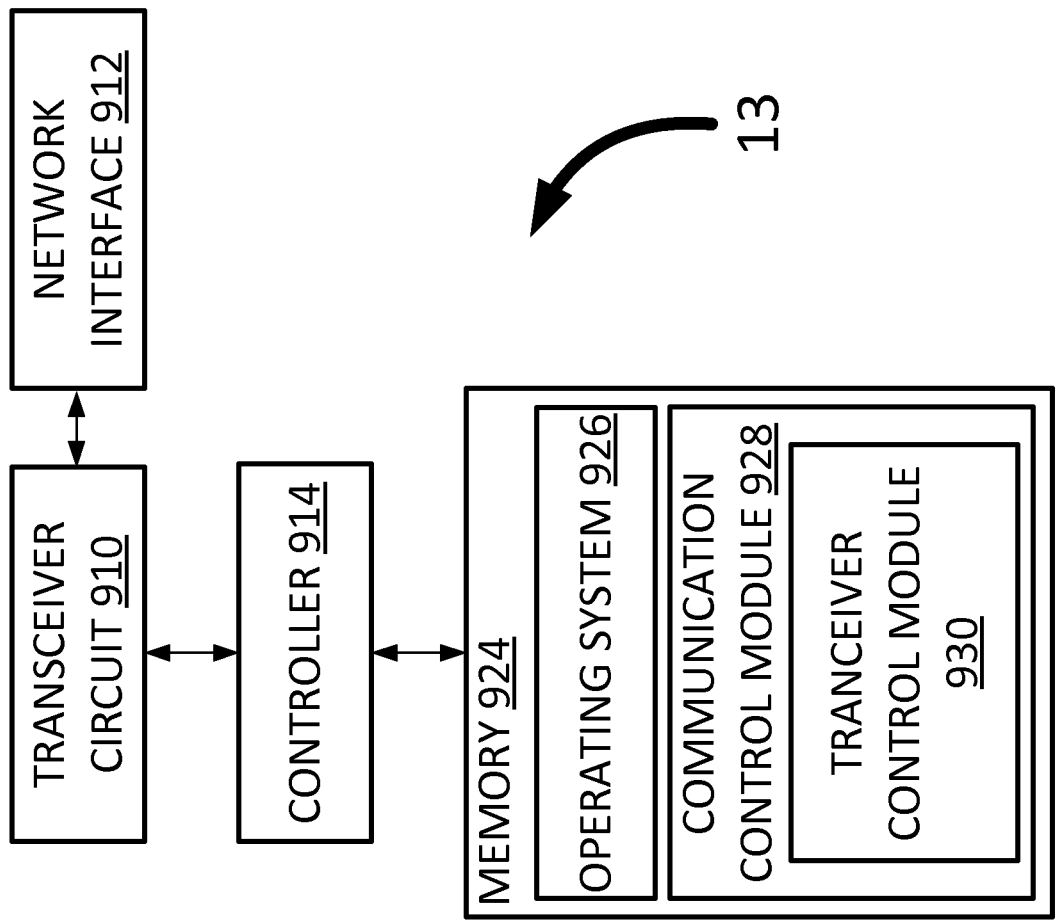
FIG. 9 shows a simplified block diagram of a PCRF for the telecommunication system of FIG. 1.

FIG. 9 is a block diagram illustrating the main components of the PCRF 13. As shown, the PCRF 13 includes transceiver circuit 910 which is operable to transmit signals to and to receive signals from the connected node(s) via a network interface 912 (including, for example, the Gx and/or Rx interfaces). A controller 914 controls the operation of the transceiver circuit 910 in accordance with software stored in a memory 924. The software includes, among other things, an operating system 926 and a communications control module 928 having at least a transceiver control module 930. The communications control module 928 is operable to control the generation of messages for communication with other entities and the related transmission of those messages, including (e.g. when configured to perform the procedure of FIG. 3) generation of the policy and charging rules and their associated provision to other entities. The communications control module 928 is responsible for signalling, to P-GW 15, the policy and charging rules provision based on the reception of the indication of IPCAN session Establishment. The communications control module is also, amongst other things, operable to control (e.g. when configured to perform the procedures of FIG. 4 or 5) the generation of the answer with UE location information (VPLMN ID or MCC) to the P-CSCF 17

Figure 10:
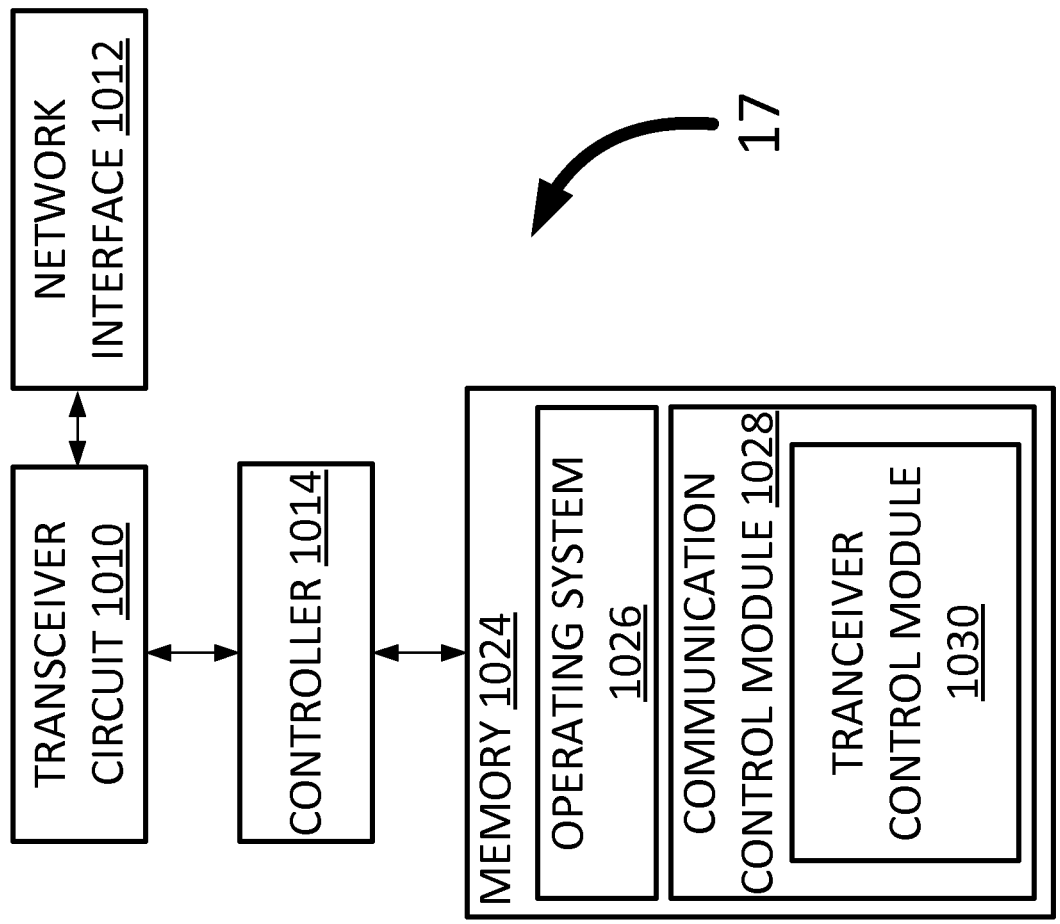
FIG. 10 shows a simplified block diagram of a P-CSCF for the telecommunication system of FIG. 1.

FIG. 10 is a block diagram illustrating the main components of the P-CSCF 17. As shown, the P-CSCF 17 includes transceiver circuit 1010 which is operable to transmit signals to and to receive signals from the connected node(s) via a network interface 1012 (including, for example, an Rx interface). A controller 1014 controls the operation of the transceiver circuit 1010 in accordance with software stored in a memory 1024. The software includes, among other things, an operating system 1026 and a communications control module 1028 having at least a transceiver control module 1030. The communications control module 1028 is operable to control the generation of messages for communication with other entities and the related transmission of those messages, including (e.g. when configured to perform the procedures of FIG. 4 or FIG. 5 generation of the Rx request. The communications control module is responsible for controlling the signalling, to the PCRF 13, including signalling of the Rx request and for receiving an answer with the location information of the UE 3. The communications control module 1028 is also operable to retrieve local emergency number(s) based on the previously received location information (e.g. VPLMN ID or MCC) and to control the generation of the 401 unauthorized response (or 200 OK or any other SIP message) which includes these local emergency number(s). When the P-CSCF 17 is configured to perform procedures such as that shown in FIG. 6, the communications control module 1028 is operable to retrieve local emergency number(s) within a SIP message (e.g. 401 Unauthorized Response, 200 OK, etc.) from other IMS nodes, e.g. I-CSCF 23 or S-CSCF 21. The communications control module is responsible for signalling, to UE, the 401 unauthorized response (or 200 OK or any other SIP message) which includes the local emergency number(s).

Figure 11:
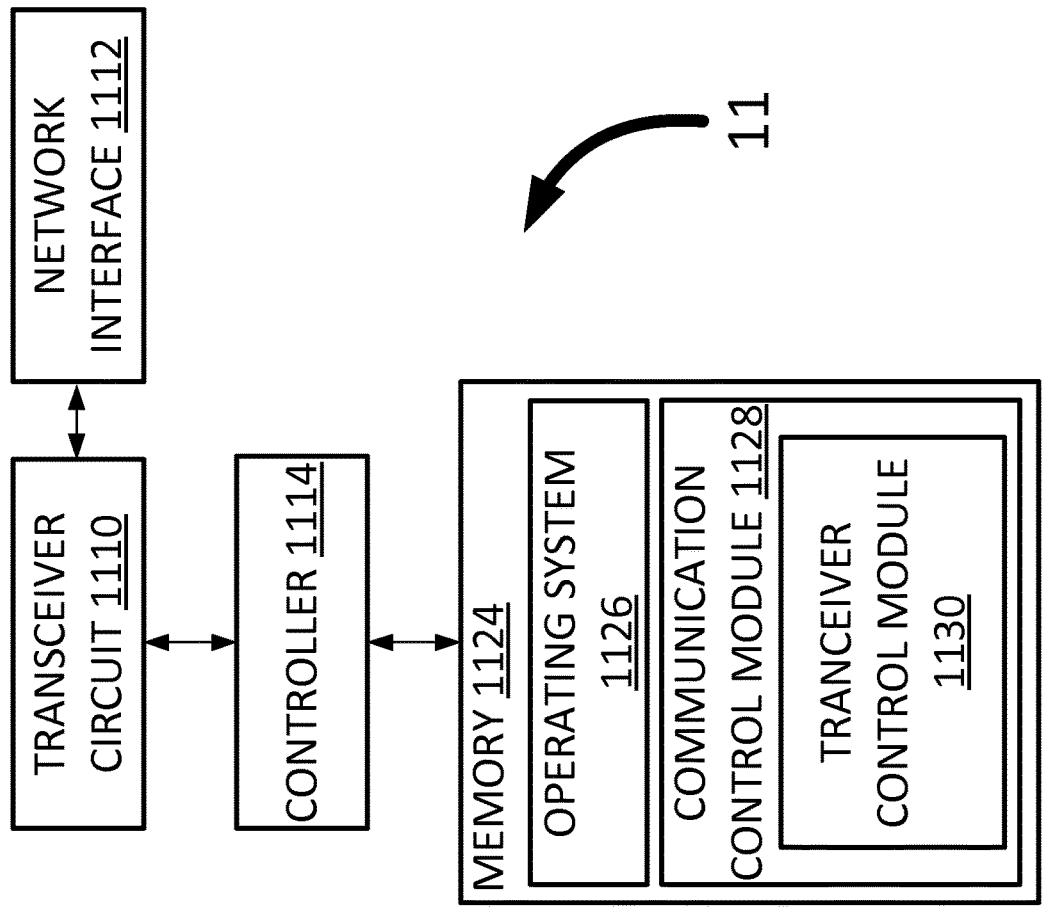
FIG. 11 shows a simplified block diagram of an HSS for the telecommunication system of FIG. 1.

FIG. 11 is a block diagram illustrating the main components of the HSS 11. As shown, the HSS 11 includes transceiver circuit 1110 which is operable to transmit signals to and to receive signals from the connected node(s) via a network interface 1112 (including, for example, the Cx interface). A controller 1114 controls the operation of the transceiver circuit 1110 in accordance with software stored in a memory 1124. The software includes, among other things, an operating system 1126 and a communications control module 1128 having at least a transceiver control module 1130. The communications control module 1128 is configured for the generation of messages for communication with other entities and the related transmission of those messages. When the HSS 11 is configured to perform procedures such as that shown in the option a) of FIG. 6, the communications control module 1128 is operable to control the generation of the Cx-Pull which includes VPLMN ID or MCC. The communications control module 1128 is responsible for signalling, to the I-CSCF 23, the Cx-Pull based on the reception of the Cx-Query. When the HSS 11 is configured to perform procedures such as that shown in the option b) of FIG. 6, the communications control module 1128 is operable to control the generation of the Cx-Put/Pull response which includes VPLMN ID or MCC. The communications control module 1128 is responsible for signalling, to the S-CSCF 21, the Cx-Put/Pull response based on the reception of the Cx-Put/Pull.

Figure 12:
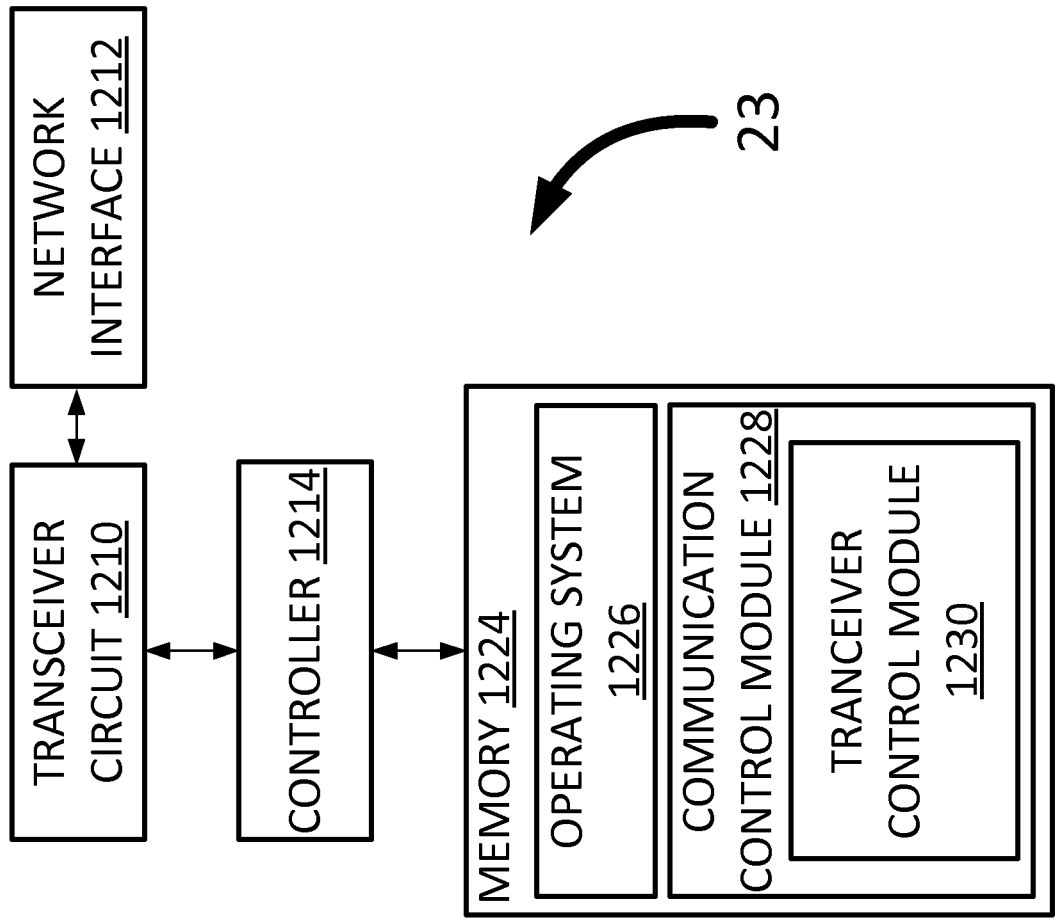
FIG. 12 shows a simplified block diagram of an I-CSCF for the telecommunication system of FIG. 1.

FIG. 12 is a block diagram illustrating the main components of the I-CSCF 23. As shown, the I-CSCF 23 includes transceiver circuit 1210 which is operable to transmit signals to and to receive signals from the connected node(s) via a network interface 1212. A controller 1214 controls the operation of the transceiver circuit in accordance with software stored in a memory 1224. The software includes, among other things, an operating system 1226 and a communications control module 1228 having at least a transceiver control module 1230. The communications control module 1228 is configured for the generation of messages for communication with other entities and the related transmission of those messages. When the I-CSCF 23 is configured to perform procedures such as that shown in FIG. 6, the communications control module 1228 is operable to control the generation of the 401 unauthorized response (or 200 OK or any other SIP message) which includes the VPLMN ID or MCC. The communications control module 1228 is responsible for signalling, to the P-CSCF 17, the 401 unauthorized response (or 200 OK or any other SIP message) based on the reception of Cx-Pull which includes VPLMN ID or MCC from HSS 11 or the 401 unauthorized response (or 200 OK or any other SIP message) which includes the VPLMN ID or MCC from S-CSCF 21.

Figure 13:
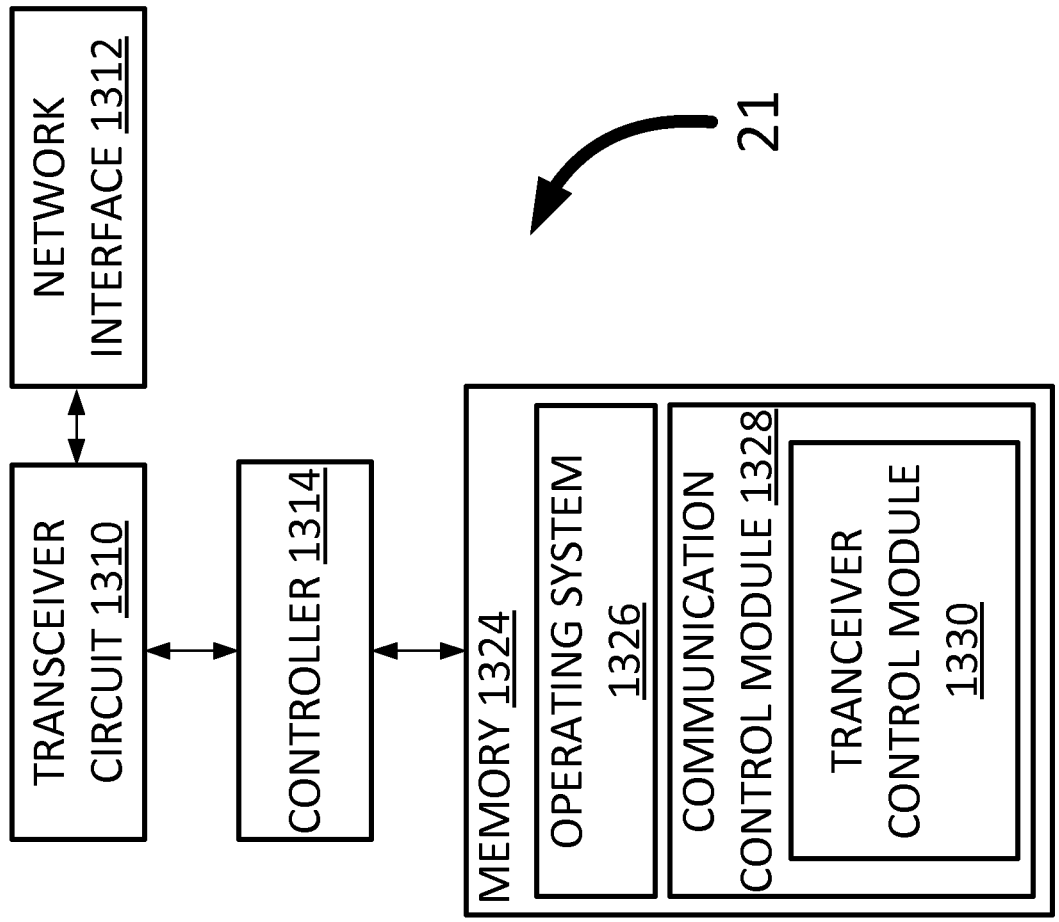
FIG. 13 shows a simplified block diagram of an S-CSCF for the telecommunication system of FIG. 1.

FIG. 13 is a block diagram illustrating the main components of the S-CSCF 21. As shown, the S-CSCF 21 includes transceiver circuit 1310 which is operable to transmit signals to and to receive signals from the connected node(s) via a network interface 1312. A controller 1314 controls the operation of the transceiver circuit in accordance with software stored in a memory 1324. The software includes, among other things, an operating system 1326 and a communications control module 1328 having at least a transceiver control module 1330. The communications control module 1328 is configured for the generation of messages for communication with other entities and the related transmission of those messages. When the S-CSCF 21 is configured to perform procedures such as that shown in FIG. 6, the communications control module 1328 is operable to control the generation of the 401 unauthorized response (or 200 OK or any other SIP message) which includes the VPLMN ID or MCC. The communications control module 1328 is responsible for signalling, to the I-CSCF 23, the 401 unauthorized response (or 200 OK or any other SIP message) based on the Cx-Put/Pull response.

Modifications and Alternatives

Detailed embodiments have been described above. As those skilled in the art will appreciate, a number of modifications and alternatives can be made to the above embodiments and variations whilst still benefiting from the inventions embodied therein.

Similar principles can also be applied for any other SIP messages from the UE to trigger the P-CSCF to request the location and to determine the roaming status and in case the UE is located in the VPLMN the corresponding local emergency numbers. Possible SIP Messages may be SIP INVITE, REGISTER, OPTIONS, MESSAGE, INFO, UPDATE, SUBSCRIBE, NOTIFY, OK etc.

The Local Emergency Numbers can be in any message from the IMS system towards the UE and could have the format of a E-164 number, a tel-URI or a SIP URI or any other format (e.g. URN) to address the PSAP. The resolution of the Local Emergency Numbers based on the VPLMN ID or MCC and is not limited to the P-CSCF but can be done in any other node, e.g. PCRF, PCEF, S-CSCF, I-CSCF, HSS, TAS etc.

When enquiring the location from the P-CSCF to the PCRF and to the PCEF, DIAMETER is the currently used protocol but it can be any other protocol (e.g. XML in future).

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, each network node (and UE) includes transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the respective network nodes as a signal over a computer network, or on a recording medium. Further, the functionality performed by part or all of this software may be performed using one or more dedicated hardware circuits.

It can be seen therefore that in one example there is provided a communication entity comprising a Proxy Call Session Control Function, P-CSCF, the P-CSCF comprising: a transceiver and a controller; wherein the transceiver is operable: to receive a register request from a user equipment, UE, in a visited public land mobile network, VPLMN; and wherein the controller is operable: to retrieve a network identifier, PLMN ID, for the VPLMN; to query a database for any local emergency number(s); and to include the PLMN ID for the VPLMN in a header and forward the register request to a Serving Call Session Control Function, S-CSCF.

The transceiver may be further operable: to receive an invite for a non UE detectable emergency call from the, UE, in the VPLMN; and the controller may be further operable: to detect that said call is an emergency call by performing a comparison of an identifier associated with said call with at least one local emergency number.

The controller may be further operable to obtain the PLMN ID from a policy control rule function. The controller may be further operable to store the PLMN ID. The controller may be further operable to include the PLMN ID in a further register request message and to control the transceiver to send the further register request message to a node of an IP multimedia core network subsystem, IMS.

In another example there is provided a communication entity comprising a Proxy Call Session Control Function, P-CSCF, the P-CSCF comprising: a transceiver and a controller; wherein the transceiver is operable: to receive an invite for a non UE detectable emergency call from a user equipment, UE, in a visited public land mobile network, VPLMN; and wherein the controller is operable: to detect that said call is an emergency call by performing a comparison of an identifier associated with said call with at least one local emergency numbers.

Following detection that said call is an emergency call, the controller may be operable to reject said invite. The controller may be operable, when rejecting said invite, to control the transceiver to respond to the UE with information indicating a different action (e.g. information identifying a local P-CSCF address for an unauthorised emergency call). Following detection that said call is an emergency call, the controller may be operable to route the call, to the correct destination, via a further call session control function (e.g. by forwarding said invite to the further call session control function). The invite may be a session initiation protocol, SIP, invite.

The transceiver may be further operable: to receive a register request from the UE in the VPLMN; and wherein the controller may be further operable: to retrieve a network identifier, VPLMN ID, for the VPLMN; to query a database for local emergency numbers; and to include the VPLMN ID in a header and forward the register request to a Serving Call Session Control Function, S-CSCF.

The register request may be a session initiation protocol, SIP, resister request.

In another example there is provided a communication entity comprising a Proxy Call Session Control Function, P-CSCF, the P-CSCF comprising: a transceiver and a controller; wherein the transceiver is operable: to receive a register request from a user equipment, UE, in a visited public land mobile network, VPLMN; and wherein the controller is operable: to obtain a network identifier, PLMN ID, for the VPLMN from a policy control rule function; and to include the PLMN ID in a further register request message and to control the transceiver to send the further register request message to a node of an IP multimedia core network subsystem, IMS.

In another example there is provided a method performed by a communication entity comprising a Proxy Call Session Control Function, P-CSCF, the method comprising: receiving a register request from a user equipment, UE, in a visited public land mobile network, VPLMN; retrieving a network identifier, PLMN ID, for the VPLMN; querying a database for any local emergency number(s); and including the PLMN ID for the VPLMN in a header and forwarding the register request to a Serving Call Session Control Function, S-CSCF.

The method may further comprise obtaining the PLMN ID from a policy control rule function. The method may further comprise storing the PLMN ID. The method may further comprise including the PLMN ID in a further register request message and sending the further register request message to a node of an IP multimedia core network subsystem, IMS.

In another example there is provided a method performed by a communication entity comprising a Proxy Call Session Control Function, P-CSCF, the method comprising: receiving an invite for a non UE detectable emergency call from a user equipment, UE, in a visited public land mobile network, VPLMN; and detecting that said call is an emergency call by performing a comparison of an identifier associated with said call with at least one local emergency numbers.

In another example there is provided a method performed by a communication entity comprising a Proxy Call Session Control Function, P-CSCF, the method comprising: receiving a register request from a user equipment, UE, in a visited public land mobile network, VPLMN; obtaining a network identifier, PLMN ID, for the VPLMN from a policy control rule function; and including the PLMN ID in a further register request message and sending the further register request message to a node of an IP multimedia core network subsystem, IMS.

Various other modifications will be apparent to those skilled in the art and will not be described in further detail here.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF ABBREVIATIONS

API Application Programming Interface
AVP Attribute Value Pair
CCA Credit-Control-Answer
eNB eNodeB
eNB Evolved NodeB
HO Handover
HPLMN Home Public Land Mobile Network
HSS Home Subscriber Server
LBO Local Breakout
LTE Long Term Evolution
MCC Mobile Country Code
MME Mobility Management Entity
NW Network
PCEF Policy Control Enforcement Function
PCRF Policy Control Rule Function
P-CSCF Proxy Call Session Control Function
PDN Packet Data Network
PGW PDN Gateway
PSAP Public Safety Answering Point
QoS Quality of Service
RAR Re-Auth-Request
S8HR S8 Home Routed
S-CSCF Serving Call Session Control Function
SGW Serving Gateway
TAS Telephony Application Server UE User Equipment
URI Uniform Resource Identifier
URN Uniform Resource Name
VoLTE Voice over LTE
VPLMN Visited Public Land Mobile Network

The invention claimed is:

1. A communication entity, comprising:
a Proxy Call Session Control Function (P-CSCF), the P-CSCF comprising:
   a transceiver operable to receive a register request from a user equipment (UE) in a visited public land mobile network (VPLMN); and
   a controller operable to:
      subscribe to location information updates from a Policy and Charging Rules Function (PCRF) in a home public land mobile network (HPLMN), when the transceiver receives the register request from the UE in the VPLMN;
      retrieve, from the PCRF in the HPLMN based on said subscription, a network identifier (PLMN ID) for the VPLMN where the UE is currently located;
      access a database to obtain a list of local emergency numbers for the VPLMN;
      include the retrieved PLMN ID in the register request before forwarding the register request to a Call Session Control Function (CSCF); and
      detect a non UE detectable emergency call using a local emergency number.

2. The communication entity according to claim 1, wherein the controller is further operable to store the PLMN ID.

3. The communication entity according to claim 1, wherein the controller is further operable to include the PLMN ID in a further register request message and to control the transceiver to send the further register request message to a node of an IP multimedia core network subsystem (IMS).

4. The communication entity according to claim 1, wherein the register request is a Session Initiation Protocol (SIP) register request.

5. A method performed by a communication entity comprising a Proxy Call Session Control Function (P-CSCF), the method comprising:
   receiving a register request from a user equipment (UE) in a visited public land mobile network (VPLMN);
   subscribing to location information updates from a Policy and Charging Rules Function (PCRF) in a home public land mobile network (HPLMN), when the P-CSCF receives the register request from the UE in the VPLMN;
   retrieving, from the PCRF in the HPLMN based on said subscription, a network identifier (PLMN ID) for the VPLMN where the UE is currently located;
   accessing a database to obtain a list of local emergency numbers for the VPLMN;
   including the retrieved PLMN ID in the register request before forwarding the register request to a Call Session Control Function (CSCF); and
   detecting a non UE detectable emergency call using a local emergency number.

6. The method according to claim 5, further comprising storing the PLMN ID.

7. The method according to claim 5, further comprising including the PLMN ID in a further register request message and sending the further register request message to a node of an IP multimedia core network subsystem (IMS).

8. A non-transitory computer-readable medium containing computer-implementable instructions which are executable by a programmable communications device to perform the method of claim 5.

* * * * *